Figure 1:
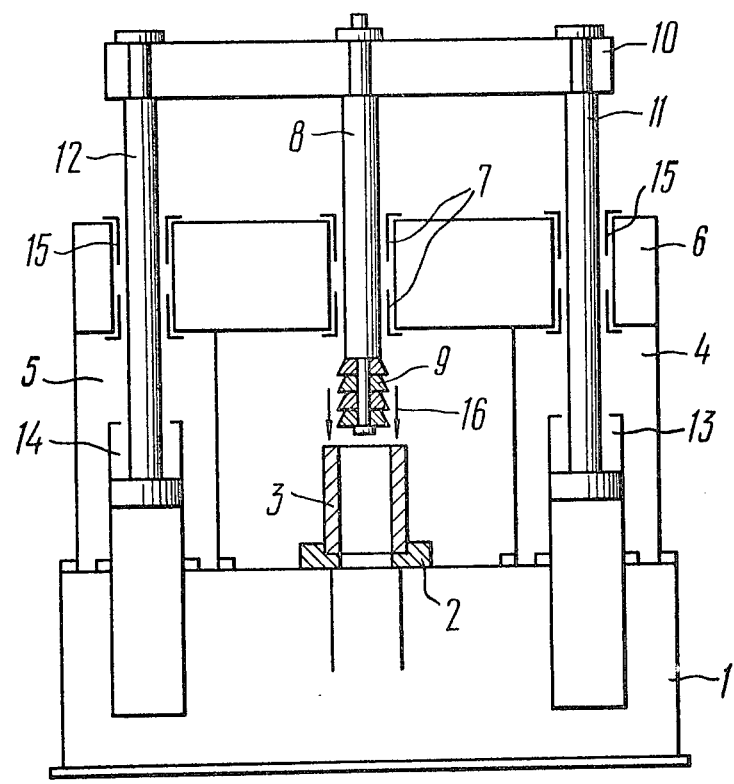

United States Patent [19]

Zuzanov et al.

[11] 4,266,894
[45] May 12, 1981

[54] VERTICAL BROACHING MACHINE FOR INTERNAL BROACHING

[76] Inventors: Georgy I. Zuzanov, ulitsa Vavilova, 93, kv. 39; Jury P. Ignatov, 4 mikroraion Yaseneva, 17, kv. 278; Sergei P. Chinenov, 4 Verkhne-Mikhailovsky pereulok, 10, korpus 5, kv. 260, all of Moscow, U.S.S.R.

[21] Appl. No.: 941,071

[22] Filed: Sep. 11, 1978

[51] Int. Cl.³ .................. B23D 37/10; B23D 41/04
[52] U.S. Cl. .................................. 409/283; 407/13; 409/286; 409/287
[58] Field of Search .................. 90/95, 96, 76, 63, 67; 409/252, 283, 286, 287, 250, 278, 279, 256; 407/13-19

[56] References Cited
U.S. PATENT DOCUMENTS

| | | | |
|---|---|---|---|
| 1,875,033 | 8/1932 | Lapointe | 90/96 |
| 2,055,349 | 9/1936 | Harless | 90/96 X |
| 3,799,030 | 3/1974 | Schubert | 90/76 X |

Primary Examiner—Z. R. Bilinsky
Attorney, Agent, or Firm—Fleit & Jacobson

[57] ABSTRACT

The machine of the invention comprises a base designed to accomodate a blank being machined, and a mandrel with a broach connected to a hydraulic drive imparting movement thereto. The mandrel is provided with a guide located between a broach-supporting end of the mandrel and its other, fixed end. The guide has a passage for the mandrel in the course of inside broaching in the blank. According to one of the embodiments of the invention, the guide is made as a traverse resting against uprights fixed on the base. The traverse has a guide passage for the broach-supporting mandrel and two holes arranged symmetrically with respect to the guide passage and serving as guides for the rods of hydraulic cylinders of the machine hydraulic drive. Each one of the hydraulic cylinders is located partly in the base and partly in the upright. The rods are interconnected above the traverse with a cross-piece supporting the mandrel with broach.

1 Claim, 3 Drawing Figures

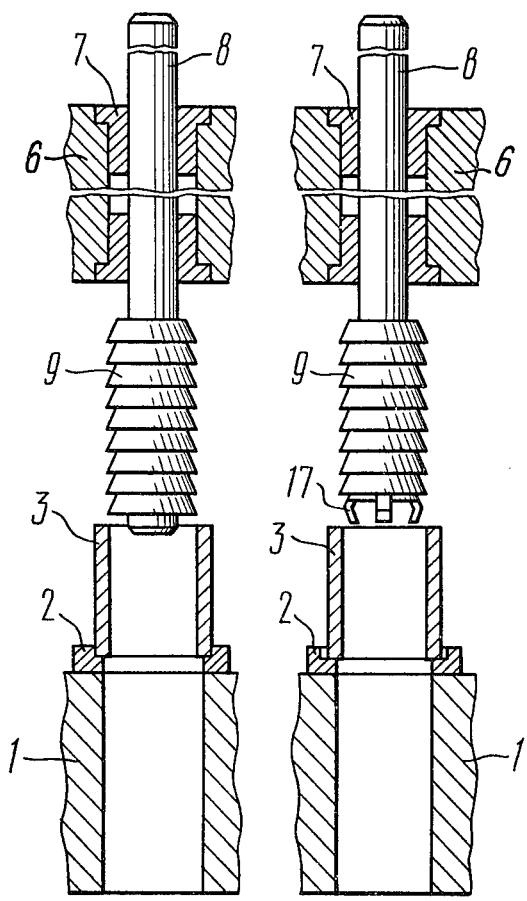

VERTICAL BROACHING MACHINE FOR INTERNAL BROACHING

The present invention relates to metal working by cutting and, more particularly, it relates to vertical broaching machines for internal broaching.

The present invention can be used most advantageously for machining cylindrical holes in parts such as bushings, for example, in mass-produced liners of tractor and automobile engines.

The mechanical working of holes presents the most labor-consuming operation in the manufacture of such parts. It is therefore that a trend has been observed recently towards the development of machines ensuring a higher efficiency when machining holes, say, in the afore-mentioned liners, as compared with prior art machines, with a view to attaining a higher economic efficiency and reducing the required amount of equipment, manpower and production areas.

At present, the machining of holes in mechanical parts by way of broaching is performed in machines manufactured by various companies.

A vertical broaching machine manufactured by Lapointe company (U.S.A.) comprises a base and a pillar made integral therewith and mounting a hydraulic cylinder to whose rod a broach is attached.

Secured on the end of the hydraulic cylinder rod is a lightweight slider displaceable upon the movement of the rod in guides provided on the pillar and adapted to effect, at the end of the upward and downward strokes of the rod, the switching over of the slide valve of hydraulic drive to vary the direction of movement of the hydraulic cylinder rod.

In the uppermost position of the mandrel, the bottom end thereof is above an attachment for blank to be broached, secured on the base, whereby it can be mounted in said attachment.

Upon its downward stroke, the rod of the hydraulic cylinder pushes with its end face the broach, connected therewith, through a hole to be broached pre-machined in the blank, said hole defining the direction of axis of said mandrel displacement. In the course of broaching, the broach is subjected to buckling inasmuch as the forces occurring upon the cutting of metal in the blank hole are overcome by the rod of the hydraulic cylinder acting upon the top end of the broach having no guide.

The broach returns to the uppermost initial position via the broached hole in the blank.

A hole pre-machined in the blank should not necessarily be normal to the bearing surface or concentric with the outer surface thereof.

Inasmuch as the broach is guided upon broaching by a hole in the blank, a uniform allowance only can be eliminated around the hole in the blank, while the non-perpendicularity of the broached hole to the bearing surface of the blank and its non-concentricity with the outer surface of the blank are not eliminated during broaching.

The buckling of the boeach as a result of internal broaching affects the accuracy of machining the hole.

In the course of the return upward stroke of said broach to its initial position, the broach surface may be damaged since the direction of the broach axis will not coincide with the direction of the axis of the rod of the hydraulic cylinder moving said broach to the initial position.

According to the information provided by the manufacturer, this latter machine is only capable of rough machining of holes.

The direction of force occurring upon broaching and coinciding with the axis of the hydraulic cylinder rod is outside of the machine pillar, thereby causing it to bend and separate from the base.

Therefore, with a view to ensuring the required rigidity of the machine, the pillar of Lapointe machines is made solid and, for better connection with the base, integral with the latter. All this adds to the machine weight and complicates its manufacture.

The position of the power hydraulic cylinder on top of the pillar causes a considerable increase of the machine height.

A vertical broaching machine produced by Karl Klink company (Federal Germany) has a base in whose guides a power carriage moves which is set to motion by downward-facing rods of two hydraulic cylinders positioned entirely above the upper plane of the base.

By a chuck provided in the power carriage and gripping the bottom end of the broach, the latter is drawn through said chuck upon the downward stroke of the power carriage when machining the hole.

Provided in the top part of the machine is a carriage whose chuck grips the top end of the broach.

Said latter prior art machine operates in the following manner.

After mounting a blank in a special attachment arranged on the machine base, the carriage is set to downward movement whose chuck grips the top end of the broach.

In so doing, the bottom end of the broach passes through a hole in the blank and is automatically gripped by the chuck attached to the power carriage in the machine base.

After that, the power carriage is set to downward motion in the guides provided in the base, whereby the broach is moved (broached) through the hole in the blank to machine the hole.

The carriage whose chuck grips the top end of the broach accompanies the broach for some time during the working stroke of the latter, and then stops to release the broach.

After the broach leaves the hole in the blank, the power carriage stops and the machined blank is removed from the machine.

Thereupon, the power carriage moves with the broach upwards until the top end of the broach is introduced in the carriage chuck which automatically grips said end.

While so doing, the bottom end of the broach is released automatically from the chuck of the power carriage, after which the carriage with the broach is moved to the uppermost initial position.

Inasmuch as the broach is guided during the machining of blanks only by the hole pre-machined in the blank, the hole after broaching will retain the possible non-perpendicularity to the bearing surface of the blank and non-concentricity with the outer surface thereof, analogous with the afore-described Lapointe machine.

In the Karl Klink machine (as in almost all of the prior art broaching machines for inside broaching) the mandrel with the working tool is not returned to the uppermost initial position via broached hole inasmuch as the direction of the broach axis (defined by the hole in the blank) may not coincide with the direction of movement of the carriage which brings the broach up to the initial position, this resulting in the damage to the surface of the broached hole.

This is the reason for employing in the Karl Klink machine (as well as in almost all of the other prior art broaching machines for internal broaching) the afore described complicated working cycle.

The complicated operating cycle of the Karl Klink machine results in a longer time required for machining the blanks, a considerably more complicated design and higher cost of the machine, as well as in a lower degree of the machine reliability in operation, and, consequently, in a longer shutdown time due to the need for correcting possible faults in the operation of the machine mechanisms.

The arrangement of the displaceable power carriage in the base of the machine adds considerably to the height of the machine, as a result of which the servicing of the working zone of the machine can only be done from a raised platform or by installing the machine in a depression in the workshop floor.

The afore-listed disadvantages complicate considerably the utilization of said prior art machine in workshops.

It is an object of the present invention to increase the efficiency of the vertical broaching machine.

It is another object of the present invention to simplify the design of the vertical broaching machine and reduce its cost.

It is still another object of this invention to improve the accuracy of internal broaching.

It is a further object of the present invention to increase the reliability of operation of the vertical broaching machine.

In the accomplishment of said and other objects of the present invention, in a vertical broaching machine for internal broaching, comprising a base designed to accommodate thereon a blank being machined, and a broach connected to a hydraulic drive imparting movement thereto, according to the present invention, the broach is attached to a mandrel, and a traverse is located between a fixed end of the mandrel and its broach-supporting end, said traverse having a passage for the mandrel in the course of internal broaching in the blank being machined.

The present invention helps considerably increase the accuracy of machining the blank hole owing to the provision of a traverse via whose passage the broach-supporting mandrel is moved in the course of broaching. The design of the herein disclosed machine provides for the return of the broach to the initial position after broaching via the machined blank hole, thereby considerably reducing the time required for the blank machining cycle and, consequently, considerably increasing the machine efficiency. In addition, the provision of the mandrel guide makes it possible to eliminate, when necessary, non-concentricity of the pre-machined blank hole with the outer bearing surface of the blank.

According to one of the embodiments of the present invention, the traverse is made as a traverse resting against base uprights and having said guide passage and two holes designed to guide rods of hydraulic cylinders of said hydraulic drive and spaced at equal distances from said passage, each one of said hydraulic cylinders being located partly in the base and partly in one of the uprights, while the ends of said rods are interconnected above the traverse by means of a cross-piece supporting the mandrel with the broach.

Such a design of the machine according to the invention helps considerably reduce the height and facilitate the servicing of the machine. In addition, the portal shape of the machine formed by the base, traverse and uprights make for a considerably increased rigidity of the overall structure, whereby the weight of the machine can be reduced.

Other objects and advantages of the present invention will become apparent from the following detailed description of exemplary embodiments thereof, with due reference to the accompanying drawings in which:

FIG. 1 shows diagrammatically the machine according to the present invention (vertical elevation); and FIGS. 2 and 3 illustrate possible ways of securing on the base the blank being machined.

The machine of the invention comprises a base 1 on whose upper surface there is secured an attachment 2 for mounting a blank 3 to be machined. Secured on the base 1 are two uprights 4, 5 on which rests a traverse 6 with a cylindrical passage formed by bushings 7 guiding a mandrel 8 which supports a broach 9. One end of the mandrel 8 is attached to a cross-piece 10 interconnecting the ends of rods 11, 12 of hydraulic cylinders 13, 14 of a hydraulic drive of the machine of the invention. Provided in the traverse 6 are holes 15 guiding the rods 11, 12 which are parallel with the mandrel 8. The holes 15 are spaced at equal distances from the guide bushings 7 while the axes of the rods 11, 12 and of the mandrel 8 are in the same vertical plane.

Holes in the bushings 7, which define the position of the axis of the mandrel 8 with the broach 9, are located in the traverse 6 coaxially with the vertical axis of symmetry of the side bearing surfaces of the attachment 2 for mounting the blank 3 (whose hole is to be broached) while the main bearing surface of the attachment 2, against which the blank 3 is resting, is perpendicular to the direction of movement of the mandrel 8 with the broach 9.

The power hydraulic cylinders are located partly in the base 1 and partly in the uprights 4 and 5.

Acting upon the top end of the blank 3 is a mechanism 16 for gripping the blank 3, which presses the latter against the bearing surface of the attachment 2 and is operatively connected with the mandrel 8.

The provision of the traverse in the mandrel 8 results in a low height of the cross-piece 10 (whose size is only governed by the considerations of strength and not by the length of guides for movement).

The overall arrangement of the machine according to the invention, in particular, the location of the power hydraulic cylinders 13 and 14 partly in the base 1 and partly in the uprights 4 and 5, makes for positioning the attachment 2 on a convenient servicing level, while the dimensions (in particular, height) and weight of the machine are less than those of prior art machines of analogous purpose and capacity.

Prior to the commencement of broaching, the mandrel 8 with the broach 9 is lifted to the uppermost initial position with the aid of the rods 11 and 12 of the hydraulic cylinders 13 and 14.

The blank 3 to be broached is mounted on the attachment 2, after which the hydraulic drive of the machine is actuated. The rods 11 and 12 move downwards and carry with them the cross-piece 10 and the mandrel 8 with the broach 9, connected with said cross-piece. While so doing, the internal broaching operation in the blank 3 is performed by the broach 9.

On termination of the downward working stroke, the movable cross-piece 10 and the mandrel 8 with broach 9 connected to said crosspiece are moved by the rods 11 and 12 upwards to the initial position.

During this upward movement, the broach 9 passes through the hole it broached in the blank 3.

After the mandrel 8 with the broach 9 leaves the hole in the blank 3, the latter is removed from the machine to be replaced with another blank 3 to be broached.

The mechanism 16 for gripping the blank 3 presses the latter with a small force after the broach 9 starts cutting into the blank 3.

The blank 3 is pressed against the bearing surface of the attachment 2 in the course of internal broaching by means of a downward-directed cutting force.

The mechanism 16 for gripping the blank 3 only serves to preclude the upward displacement of the blank during the return stroke of the broach 9 which, due to slight friction between the broach 9 and the wall of the hole in the blank 3, will tend to carry the blank 3 upwards.

The provision in the mandrel 8 of the guide bushings 7, whose holes are coaxial with the vertical axis of symmetry of the bearing centering surfaces of the attachment 2 and perpendicular to the main bearing surface of said attachment, ensures the coincidence of the axis of the mandrel 8 with the direction of force displacing the mandrel 8, as well as helps attain the perpendicularity of the axis of the mandrel 8 to the main bearing surface of the attachment 2 both during the downward working stroke of the mandrel 8 with the broach 9 and during their upward stroke when the broach 9 passes through the hole broached in the blank 3.

Owing to this, the broach 9 does not cause damage to the surface of the hole broached in the blank 3 while moving through said hole during the upward stroke of the mandrel 8 with the broach 9.

When the concentricity of hole with the outer bearing surface of the blank is to be attained as a result of internal broaching in the blank 3, the latter is rigidly mounted in the attachment 2 whose axis of symmetry coincides with the axis of the guide bushings 7 (FIG. 2).

While so doing, the broach 9 removes a non-uniform allowance around the hole in the blank 3 and thereby eliminates the non-concentricity of the hole in the blank 3 with the outer bearing surface of said blank and the non-perpendicularity of the axis of said hole to the main bearing surface of the blank.

In case it is necessary to remove from the hole of the blank 3 a uniform allowance around a pre-machined hole, the blank is placed in the attachment 2 with a slight gap between the outer surface of the blank 3 and the centering side surface of the attachment 2 (FIG. 3).

In this latter case, set on the bottom end of the mandrel 8 with the broach 9 coaxially therewith is a springy collet 17 having an outer diameter somewhat greater than the diameter of the hole in the blank 3.

Upon the downward stroke of the mandrel 8 with the broach 9, the collet 17 is the first to enter the hole in the blank 3 to shift the latter in the horizontal plane and make it coaxial with the mandrel 8, thereby ensuring the removal of a uniform allowance over the circumference of a hole pre-machined in the blank 3.

It is also possible to provide the machine of the invention with a single power hydraulic cylinder mounted above the traverse coaxially with the mandrel and working tool.

In so doing, the rod of the power hydraulic cylinder can be made integral with the mandrel 8 or rigidly connected therewith.

Such an arrangement of the machine according to the invention may prove practical for machining blanks 3 of small height (such that the machine having a single cylinder above the mandrel 8 with the broach 9 will not appear too high) and provided it is possible to manufacture a single power cylinder having a diameter sufficient to ensure the force required for broaching.

The single-cylinder embodiment of the machine of the invention may also prove feasible when the manufacturing and operating conditions permit of manufacturing and using a machine of considerable height.

What is claimed is:

1. A vertical broaching machine for internal broaching, comprising: a base for mounting a blank being machined; a cross-piece supported for movement towards and away from said base; a mandrel having one end fixed to said cross-piece and one end supporting a broach; a spring collet positioned at the bottom of the broach and coaxial therewith, said collet centering a blank with respect to said broach during movement of the cross-piece towards the base; a guide supported by said base and located between said fixed end of said mandrel and said end supporting said broach; said guide having a passage for said mandrel in the course of said internal broaching of said blank; a hydraulic drive connected with said mandrel for imparting movement thereto, said base having uprights extending vertically upward therefrom and said guide being made as a traverse resting against said uprights and having said passage for said mandrel and two additional passages spaced at equal distances from said mandrel passage, said hydraulic drive including hydraulic cylinders having rods guided in said two additional passages of said traverse, each one of said hydraulic cylinders being located partly in the base and partly in one of said uprights, while the ends of said rods are interconnected above the traverse by the cross-piece supporting the mandrel.

* * * * *